(12) United States Patent
Harada

(10) Patent No.: US 11,934,718 B2
(45) Date of Patent: Mar. 19, 2024

(54) PRINTING APPARATUS

(71) Applicant: SEIKO EPSON CORPORATION, Tokyo (JP)

(72) Inventor: Takeshi Harada, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/180,237

(22) Filed: Mar. 8, 2023

(65) Prior Publication Data

US 2023/0289114 A1 Sep. 14, 2023

(30) Foreign Application Priority Data

Mar. 10, 2022 (JP) ................. 2022-037267

(51) Int. Cl.
*G06F 3/12* (2006.01)
(52) U.S. Cl.
CPC .......... *G06F 3/1229* (2013.01); *G06F 3/1211* (2013.01); *G06F 3/1236* (2013.01); *G06F 3/128* (2013.01)
(58) Field of Classification Search
None
See application file for complete search history.

(56) References Cited

U.S. PATENT DOCUMENTS

| | | | | |
|---|---|---|---|---|
| 10,868,436 B1 * | 12/2020 | Chen | ...................... | H01M 10/46 |
| 11,381,701 B2 * | 7/2022 | Kwak | ........................ | G06F 1/26 |
| 11,507,162 B2 * | 11/2022 | Ohtake | .................... | H02J 50/12 |
| 2011/0164275 A1 * | 7/2011 | Mikura | .................. | G06F 3/1203 |
| | | | | 358/1.15 |
| 2017/0368853 A1 * | 12/2017 | Satake | ....................... | B41J 29/38 |
| 2021/0384752 A1 * | 12/2021 | Hayasaki | ............. | H04R 1/1008 |
| 2023/0138618 A1 * | 5/2023 | Harada | .............. | H04N 1/00307 |
| | | | | 358/1.15 |
| 2023/0161723 A1 * | 5/2023 | Kasichainula | ........ | G06F 13/382 |
| | | | | 710/105 |

FOREIGN PATENT DOCUMENTS

JP 2015-174373 A 10/2015

* cited by examiner

*Primary Examiner* — Helen Zong
(74) *Attorney, Agent, or Firm* — Global IP Counselors, LLP

(57) ABSTRACT

There is provided a printing apparatus including: a printing section; a first USB port; a second USB port; and a control section, and the control section is configured to set a state where the printing apparatus operates as a USB device when an device coupled to a USB port is a USB host, set a state where the printing apparatus operates as a USB host when the device coupled to the USB port is a USB device, set a state of supplying a first power amount of energy to the device coupled to the USB port, set a state of supplying a second power amount of energy, which is greater than the first power amount, to the device coupled to the USB port, and perform setting for giving priority to at least one of the states over another state when the printing section is not performing printing.

8 Claims, 9 Drawing Sheets

PRINTING APPARATUS

The present application is based on, and claims priority from JP Application Serial Number 2022-037267, filed Mar. 10, 2022, the disclosure of which is hereby incorporated by reference herein in its entirety.

BACKGROUND

1. Technical Field

The present disclosure relates to a printing apparatus.

2. Related Art

In recent years, the USB-Type-C interface became widespread, and various devices are equipped with the USB-Type-C interface. With the spread of such a USB-Type-C interface, products equipped with a USB-Type-C interface in addition to the USB-Type-B interface also became widespread in printing apparatuses.

The external device coupled to the USB-Type-C interface can be in either a host state or a device state. Therefore, it is necessary for the printing apparatus to switch between its own host state or device state according to the host state or device state of the coupled external device. Further, when the printing apparatus supplies power to the coupled external device, it is necessary to switch the supply voltage according to the coupled external device. JP-A-2015-174373 discloses a printing apparatus corresponding to the USB-Type-C standard corresponding to USB-PD.

The printing apparatus of the related art has a problem that a state originally desired to be prioritized by a user is replaced with another state by coupling a new external device.

SUMMARY

According to an aspect of the present disclosure, there is provided a printing apparatus including: a printing section; a first external communication interface; a second external communication interface; and a control section, in which the first external communication interface is a first USB port, the second external communication interface is a second USB port, and the control section is configured to set a state where the printing apparatus operates as a USB device when an external device coupled to a USB port is a USB host, set a state where the printing apparatus operates as a USB host when the external device coupled to the USB port is a USB device, set a state of supplying a first power amount of energy to the external device coupled to the USB port, set a state of supplying a second power amount of energy, which is greater than the first power amount, to the external device coupled to the USB port, and perform setting for giving priority to at least one of the states over another state when the printing section is not performing printing.

DESCRIPTION OF EXEMPLARY EMBODIMENTS

Figure 1:
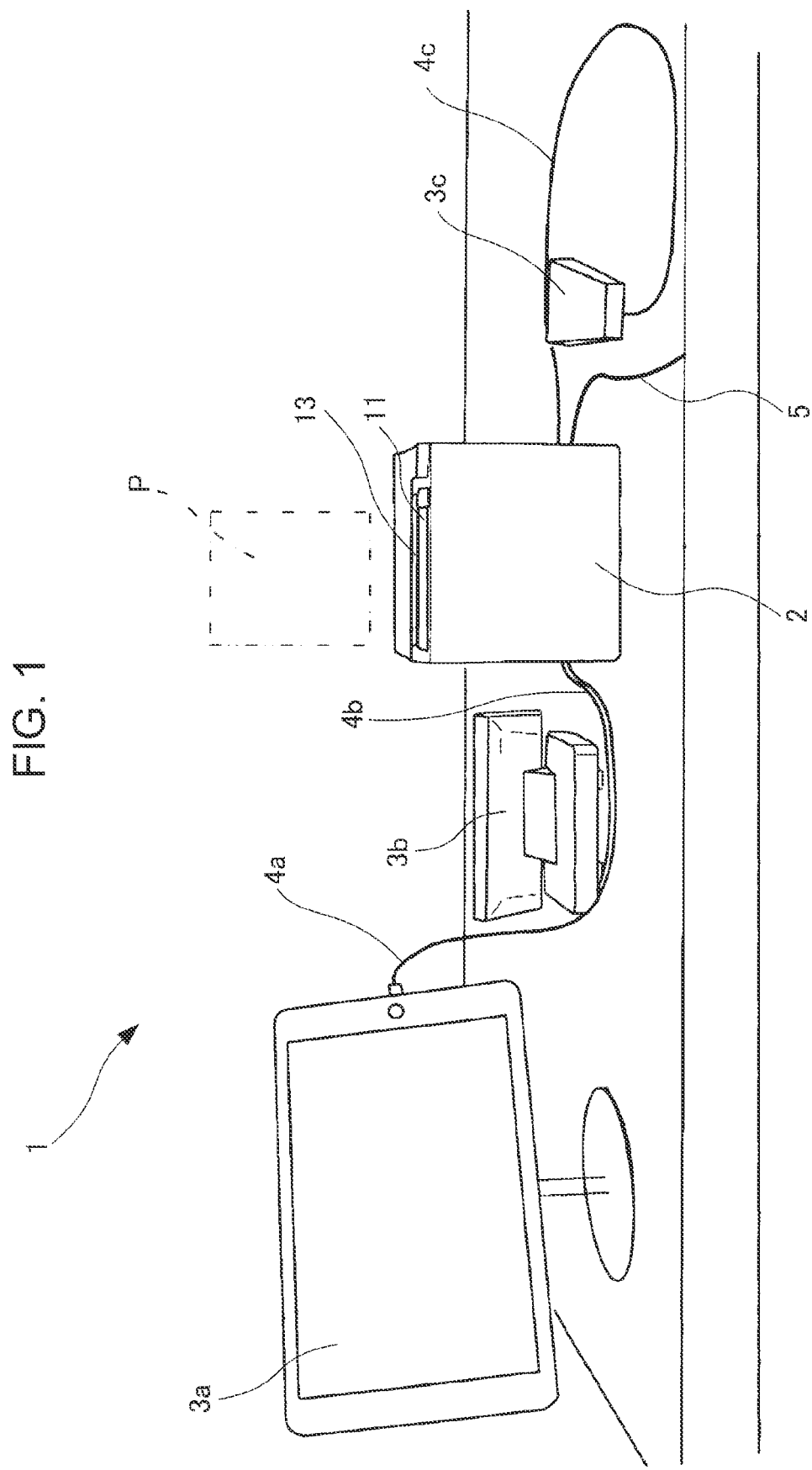
FIG. 1 is a view illustrating a schematic configuration of a printing system.

Hereinafter, appropriate embodiments of the present disclosure will be described with reference to the drawings. The drawing to be used is for convenience of description. In addition, the embodiments which will be described below do not inappropriately limit the contents of the present disclosure described in the claims. In addition, not all of the configurations which will be described below are necessarily essential components of the present disclosure.

1. First Embodiment

1-1. Schematic Configuration of Printing System

FIG. 1 is a view illustrating a schematic configuration of a printing system 1 according to the present embodiment. The printing system 1 is used in a store, for example, and has a function of performing accounting according to products and services purchased by a customer, a function of informing the customer of information related to accounting, and a function of issuing a receipt according to the accounting. For example, the printing system 1 is an example of a point of sale (POS) system.

The printing system 1 includes a printing apparatus 2, a smart device 3a, a customer display 3b, and a handy scanner 3c. The printing system 1 may have a configuration in which some of these elements are omitted or changed, or other elements are added.

The printing apparatus 2 is supplied with power by being coupled to, for example, a commercial AC power source (not illustrated) via a power cable 5. The printing apparatus 2 to which the power is supplied performs printing on a medium P, and the medium P is discharged from a medium discharge port 13. In other words, the printed recording part of the medium P is discharged from the medium discharge port 13.

The smart device 3a, the customer display 3b, and the handy scanner 3c are examples of external devices that can be coupled to the printing apparatus 2 via a USB interface 60 included in the printing apparatus 2, as will be described later. Specifically, the smart device 3a is coupled to the printing apparatus 2 via a USB cable 4a, the customer display 3b is coupled to the printing apparatus 2 via a USB cable 4b, and the handy scanner 3c is coupled to the printing apparatus 2 via a USB cable 4c.

Although FIG. 1 illustrates an example in which the smart device 3a, the customer display 3b, and the handy scanner 3c are coupled to the printing apparatus 2, the number of external devices that can be coupled to the printing apparatus 2 is not limited to three. For example, the number of external devices that can be coupled to the printing apparatus 2 depends on the USB standard. According to the USB standard, the maximum number of external devices that can be coupled is 127, and thus the maximum number of external devices that can be coupled to the printing apparatus 2 is 127.

The smart device 3a is a terminal that can be carried by the user. For example, the smart device 3a is a tablet terminal or a smartphone, and the smart device 3a includes a communication section that performs data communication according to a predetermined communication standard, and communicates with the printing apparatus 2 via this communication section.

Here, unless otherwise specified, the user refers to a salesclerk who provides products or services to customers, or a trader who installs the printing system 1 in the store, and sets external devices such as the printing apparatus 2 and the smart device 3a.

The smart device 3a includes a battery and operates by the power charged in the battery. The smart device 3a is supplied with power from the printing apparatus 2 to charge the battery. Further, the smart device 3a is equipped with various applications for generating commands, print data, and the like for controlling the printing apparatus 2. For example, the application mounted on such the smart device 3a is an application corresponding to the POS system.

The smart device 3a transmits a command related to control and a command related to printing to the printing apparatus 2. Upon receiving these commands, the printing apparatus 2 stores these commands in a receiver buffer (not illustrated).

The control-related command includes, for example, a setting command for instructing format setting and a status request command for instructing a request for information related to the state of the printing apparatus 2. In response to this status request command, for example, the printing apparatus 2 transmits information indicating that printing is completed to the smart device 3a.

The command related to printing includes, for example, a print command for instructing printing, a line feed command for instructing line feed, a line stack command for instructing line stack, a cutter command for instructing to cut the medium P, and the like. The command related to printing includes a command for instructing drive to any of a thermal head 21, a transport section 23, and a cutting section 24 illustrated in FIG. 2.

The smart device 3a generates print data such as letters and images to be printed by the printing apparatus 2. The smart device 3a transmits a print command including the generated print data to the printing apparatus 2 according to a predetermined communication standard. The printing apparatus 2 executes a print command and prints letters, images, and the like on the medium P based on the print data.

The customer display 3b can be used, for example, by placing the customer display 3b on a counter table in a store. The customer who purchased the product at the store can confirm the price displayed on the customer display 3b and recognize the payment amount. Further, the customer display 3b may display the product name purchased by the customer, the payment method, the date and time of purchase, the name of the store where the customer purchased, and the like.

For example, when accounting and payment of purchased items by the customer himself or herself, such as a so-called self-checkout, the salesclerk who is the user may omit the customer display 3b from the printing system 1. In this case, it is preferable that the content displayed on the customer display 3b be displayed on the smart device 3a.

For example, it is preferable that the product name purchased by the customer, the payment method, the date and time of purchase, the name of the store where the customer purchased, and the like be displayed on the smart device 3a. In this manner, the salesclerk who is the user can reduce the power consumption of the printing system 1 by omitting the customer display 3b and reducing the number of external devices depending on the situation, and can simplify the configuration of the printing system 1.

The handy scanner 3c operates by receiving power supplied from the printing apparatus 2. The printing apparatus 2 inputs information related to the image scanned by the handy scanner 3c.

For example, the user scans a barcode attached to the product using the handy scanner 3c. Information related to the scanned image is output to the smart device 3a via the printing apparatus 2. The smart device 3a can acquire information related to a product, information related to the price, and the like.

Further, for example, a salesclerk who is a user scans a barcode presented by a customer by a smartphone or the like using the handy scanner 3c. Information related to the scanned image is output to the smart device 3a via the printing apparatus 2.

The smart device 3a can acquire information related to a payment method, information related to the payment amount, and the like. Based on these pieces of information, the smart device 3a may complete the payment of the fee via the online payment service and display the information related to the payment completion on the customer display 3b via the printing apparatus 2. Accordingly, the customer can confirm that the payment is completed.

1-2. Function of Printing System

Figure 2:
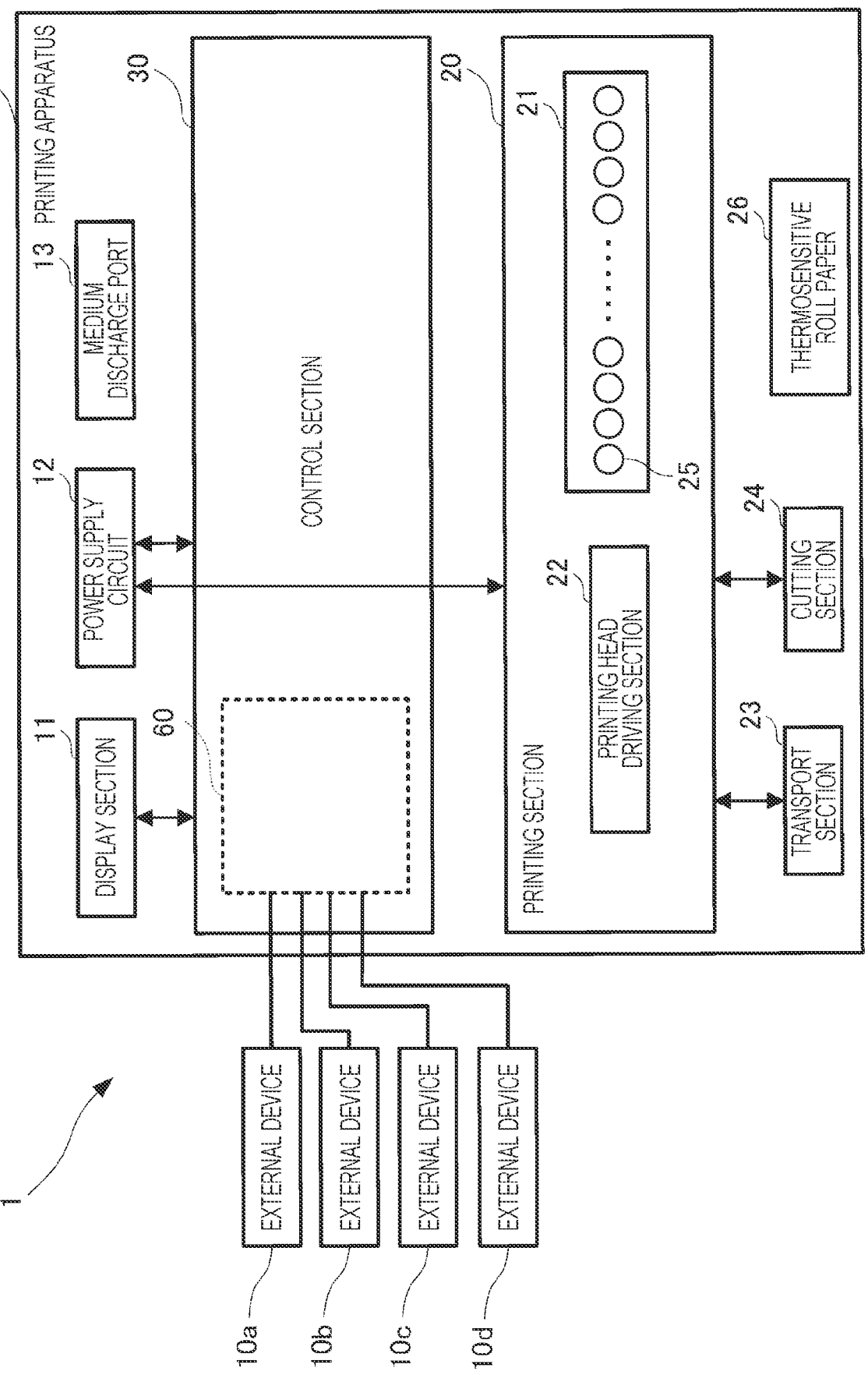
FIG. 2 is a block diagram of the printing system.

The functional configuration of the printing system 1 will be described with reference to FIG. 2. FIG. 2 is a block diagram of the printing system 1.

The printing system 1 includes an external device 10a, an external device 10b, an external device 10c, an external device 10d, and the printing apparatus 2. The smart device 3a, the customer display 3b, and the handy scanner 3c described above are examples of the external device 10a, the external device 10b, the external device 10c, and the external device 10d.

The printing apparatus 2 includes a display section 11, a power supply circuit 12, a medium discharge port 13, a printing section 20, and a control section 30.

The display section 11 includes, for example, a plurality of LEDs. The display section 11 is electrically coupled to the control section 30 and is controlled by the control section 30. The display section 11 displays, for example, information related to the state of the printing apparatus 2 by blinking the LED. The display section 11 may be a liquid crystal display device.

The power supply circuit 12 can supply power to the display section 11, the printing section 20, and the control section 30. The power supply circuit 12 is coupled to, for example, a commercial AC power source, and can convert the power supplied from the commercial AC power source into appropriate power and supply the converted power to each section.

The power supply circuit 12 includes, for example, a DC-DC converter, a resistance element, a switching element, a transistor, and the like. The power supply circuit 12 can supply power to the external device 10a, the external device 10b, the external device 10c, and the external device 10d, which are electrically coupled to the printing apparatus 2 via the USB interface 60. For example, the power supply circuit 12 can supply power to the smart device 3a, the customer display 3b, and the handy scanner 3c.

The printing section 20 includes the thermal head 21 and a printing head driving section 22. Further, the printing section 20 is electrically coupled to the transport section 23 and the cutting section 24. The transport section 23 has a transport roller (not illustrated), and the cutting section 24 has a cutter including a first blade and a second blade. The first blade is a movable blade that moves between the standby position and the cutting position, and the second blade is a fixed blade that engages with the first blade that moves to the cutting position to cut the recording paper. The printing section 20 is electrically coupled to the power supply circuit 12 and operates by receiving power supplied from the power supply circuit 12. Further, the printing section 20 is controlled by the control section 30. Further, the printing section 20 executes printing on the medium P based on the print data output from the smart device 3a, which is an example of the external device, for example. As described above, an example of an electronic device including the printing section 20 that performs printing on the medium P is the printing apparatus 2.

The thermal head 21 has a large number of heat generating elements 25. A large number of heat generating elements 25 are arranged in a direction orthogonal to the transport direction of thermosensitive roll paper 26 which is the medium P. The heat generating element 25 is energized to apply heat to the printed surface of the thermosensitive roll paper 26. Accordingly, the thermal head 21 can print letters, images, and the like on the thermosensitive roll paper 26. The part drawn out from the thermosensitive roll paper 26 may be described as recording paper. Further, the printing section 20 is not limited to printing by the thermal head 21, and may perform printing by an ink jet method, an impact dot matrix method, or a laser method. The medium P is not limited to the thermosensitive roll paper 26, but may be a sheet paper, a label paper, or the like.

The printing head driving section 22 is controlled by the control section 30 to control the energization of the thermal head 21 to the heat generating element 25. The transport section 23 is controlled by the control section 30 to rotate the transport roller to transport the thermosensitive roll paper 26. The cutting section 24 is controlled by the control section 30 and drives the first blade to slide toward the second blade to cut the thermosensitive roll paper 26.

Figure 3:
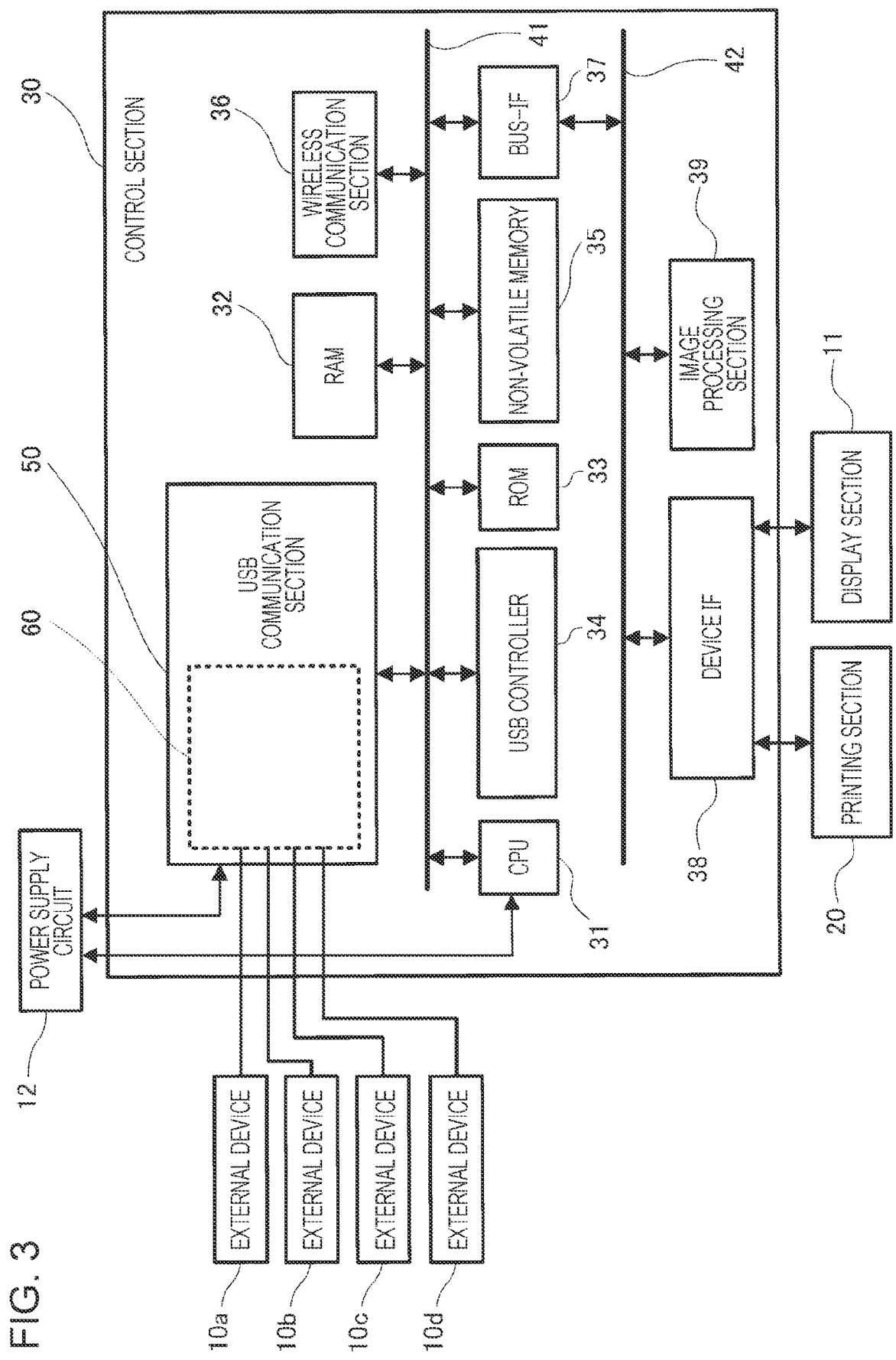
FIG. 3 is a block diagram of a control section of a printing apparatus.

FIG. 3 is a block diagram of the control section 30 of the printing apparatus 2. As illustrated in FIG. 3, the control section 30 includes a central processing unit (CPU) 31, a random access memory (RAM) 32, a read only memory (ROM) 33, a USB controller 34, a non-volatile memory 35, a wireless communication section 36, a USB communication section 50, a BUS-IF 37, a device IF 38, and an image processing section 39. The CPU 31 is an example of a control circuit. Although the CPU is exemplified as an example of the control circuit, the control circuit may be configured to include hardware such as field programmable gate array (FPGA) in place of the CPU or in addition to the CPU.

The CPU 31 performs the main control of the printing apparatus 2. The CPU 31 is electrically coupled to the RAM 32, the ROM 33, the USB controller 34, the non-volatile memory 35, the wireless communication section 36, the USB communication section 50, and the BUS-IF 37 via a system bus 41.

The RAM 32 is a memory that can be read and written at any time to provide a work area of the CPU 31. The RAM 32 can also be used as an image memory for temporarily storing image data. The ROM 33 is a boot ROM and stores a boot program of the system. The non-volatile memory 35 stores system software, set value data, and the like that need to be retained even after the power supply of the printing apparatus 2 is cut off.

The USB controller 34 controls the USB interface 60 via the system bus 41. In other words, the USB controller 34 controls the external device 10a, the external device 10b, the external device 10c, and the external device 10d, which are coupled to the USB interface 60. For example, the USB controller 34 may be configured to include hardware such as a system on a chip (SoC).

Figure 4:
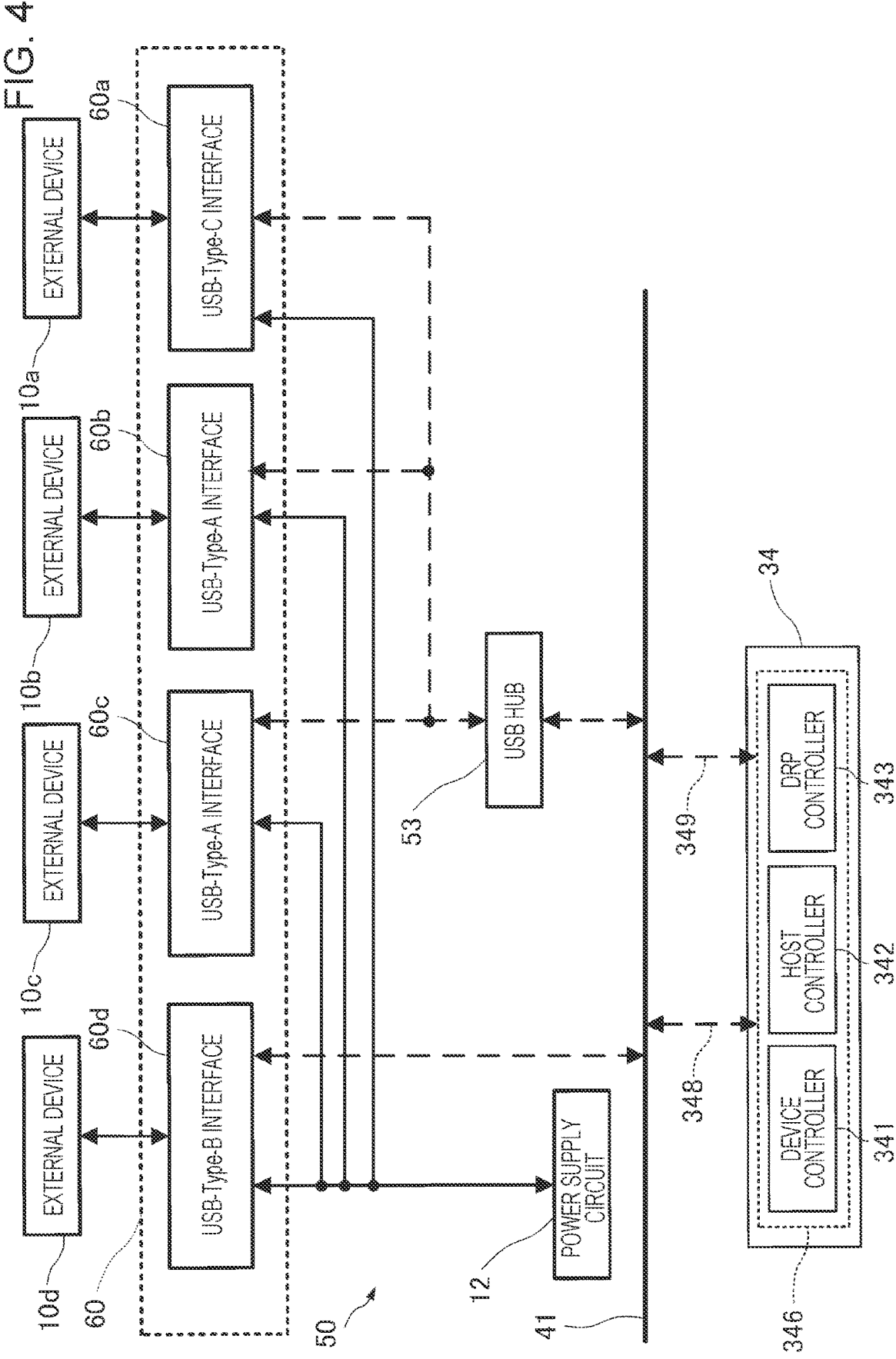
FIG. 4 is a block diagram of a USB controller and a USB interface.

As an example of the hardware configuration of the USB controller 34, FIG. 4 shows a configuration example in which the USB controller 34 includes an integrated circuit 346. In this integrated circuit 346, electric signals from the external devices 10a, 10b, and 10c are input via a signal path 349, and electric signals from the external device 10d are input via a signal path 348. Then, the integrated circuit 346 generates a control signal based on the electric signal input via the signal paths 348 and 349, and transmits the control signal to the CPU 31 via the system bus 41. The CPU 31 controls the state of the printing apparatus 2 in response to this control signal. Specifically, the printing apparatus 2 is in the state of either the host or the device.

The electric signal transmitted via the signal path 348 is an electric signal from the external device 10d transmitted via a USB-Type-B interface 60d. Generally, the external device 10d functions as a host. On the other hand, the electric signal transmitted via the signal path 349 is an electric signal from the external device 10a transmitted via a USB-Type-C interface 60a. Generally, the external device 10a functions as either a host or a device. Similarly, the electric signal transmitted via the signal path 349 is an electric signal transmitted via USB-Type-A interfaces 60b and 60c. Generally, the external devices 10b and 10c function as hosts.

For example, the electric signal transmitted via the signal path 349 may be an electric signal from the external device 10a that functions as a host or a device and an electric signal from the external devices 10b and 10c that function as hosts. Further, the electric signal transmitted via the signal path 348 may be an electric signal from the external device 10d that functions as a host. As described above, the signal path of the electric signal may be separated according to the state of the host or the device of the external device coupled to the USB interface 60. The various controllers included in the USB controller 34 will be described later.

The wireless communication section 36 can be coupled to an external device by using wireless communication. The wireless communication section 36 can communicate with an external device according to a standard such as Wi-Fi (registered trademark) or Bluetooth (registered trademark). Further, a wired communication section that can be coupled to an external device by using a wired LAN communication of a standard such as Ethernet (registered trademark) may further be provided. The BUS-IF 37 is an interface that electrically couples the system bus 41 and an image bus 42. The BUS-IF 37 can operate as a bus bridge that converts the data structure.

In addition to the BUS-IF 37, the device IF 38 and the image processing section 39 are electrically coupled to the image bus 42. The device IF 38 is an interface that couples the control section 30, the printing section 20, and the display section 11. The device IF 38 can perform data synchronous and asynchronous conversion. The image processing section 39 can execute predetermined processing on the data related to printing output to the printing section 20.

1-3. USB Interface

FIG. 4 is a block diagram of the USB communication section 50 and the USB interface 60. FIGS. 5 to 8 are views illustrating each interface included in the USB interface 60. As illustrated in FIG. 4, the USB communication section 50 includes the USB interface 60 and a USB hub 53.

The USB hub 53 is electrically coupled to the USB interface 60. Further, the USB hub 53 receives an instruction from the USB controller 34 via the system bus 41 and operates between the USB controller 34 and the USB interface 60. For example, the USB hub 53 may be configured to include hardware such as an integrated circuit. Further, the USB hub 53 serves as a line concentrator or a relay device in the USB network.

Further, the USB interface 60 includes the USB-Type-C interface 60a, the USB-Type-A interfaces 60b and 60c, and the USB-Type-B interface 60d.

In FIG. 4, an example in which the USB-Type-C interface 60a is coupled to the external device 10a, the USB-Type-A interface 60b is coupled to the external device 10b, the USB-Type-A interface 60c is coupled to the external device 10c, and the USB-Type-B interface 60d is coupled to the external device 10d is illustrated, but the present disclosure is not limited thereto. The USB interface 60 may include a USB interface of another standard such as mini-USB-Type-A or micro-USB-Type-A.

The power supply circuit 12 illustrated in FIG. 3 supplies power to the USB-Type-C interface 60a, the USB-Type-A interfaces 60b and 60c, and the USB-Type-B interface 60d. The power supply circuit 12 may be configured to supply power to the USB hub 53. Further, the power supply circuit 12 may be configured not to supply power to the USB-Type-B interface 60d.

The USB communication section 50 may be configured to include a PD controller. The PD controller, for example, performs a control to supply power corresponding to the USB power delivery (USB-PD) standard to the external device 10a coupled to the USB-Type-C interface 60a. The power supply circuit 12 may be configured to supply power to the USB-Type-C interface 60a, or a power supply circuit different from the power supply circuit 12 may be configured to supply power to the USB-Type-C interface 60a. In any case, the power corresponding to the USB-PD standard may be supplied to the USB-Type-C interface 60a.

For example, a power supply circuit that supplies power corresponding to the USB-PD standard to the USB-Type-C interface 60a generates voltages different from 5 V, 9 V, and 12 V, and supplies a plurality of different voltages to the external device 10a. In addition, the power supply circuit may be configured to supply a constant current regardless of the voltage supplied to the external device 10a, or may be configured to supply a different current depending on the supplied voltage.

Figure 5:
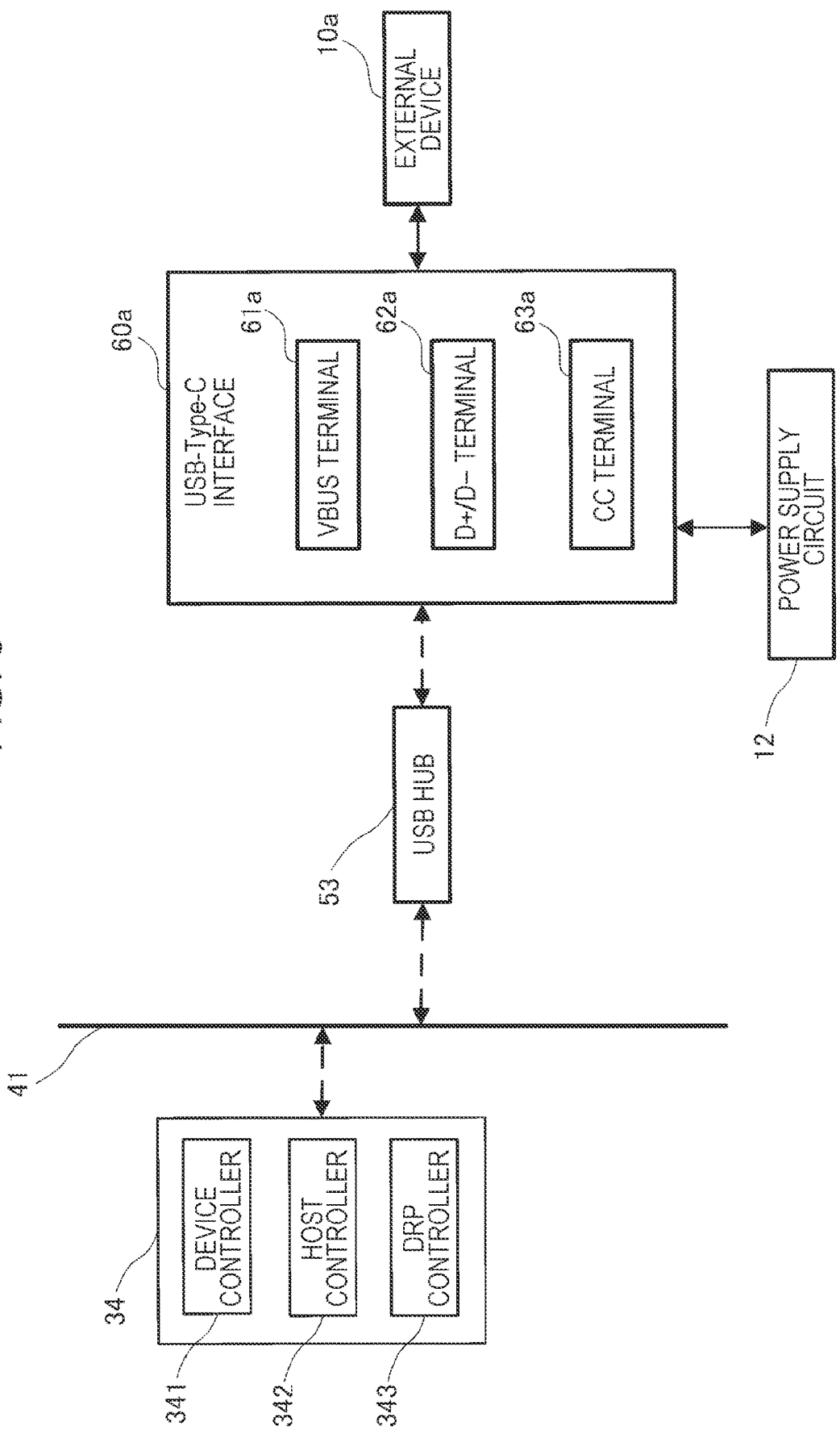
FIG. 5 is a block diagram of the USB controller and a USB-Type-C interface.

The USB-Type-C interface 60a will be described with reference to FIG. 5. FIG. 5 is a block diagram of the USB controller 34 and the USB-Type-C interface 60a.

The USB controller 34 includes a device controller 341, a host controller 342, and a dual role port (DRP) controller 343. The USB-Type-C interface 60a is controlled by the DRP controller 343 of the USB controller 34 via the system bus 41 and the USB hub 53.

The USB-Type-C interface 60a includes a VBUS terminal 61a, a D+/D− terminal 62a, and a configuration channel (CC) terminal 63a.

The DRP controller 343 controls data transmission/reception from the external device 10a coupled to the USB-Type-C interface 60a. The DRP controller 343 performs the data transmission control for transmitting data such as commands related to printing to the CPU 31 via the system bus 41.

The DRP controller 343 mediates mutual communication performed between the USB controller 34 and the USB interface 60, for example, in synchronous serial communication or the like. The synchronous serial communication may be, for example, inter-integrated circuit (I2C) communication.

The VBUS terminal 61a is a so-called power input/output terminal. The VBUS terminal 61a is a terminal for transmitting and receiving power to and from the external device 10a. Therefore, power can be received between the printing apparatus 2 and the external device 10a.

The port that supplies power is a source, and the port that receives power is a sink. The device that functions as a source is a provider, and the device that functions as a sink is a consumer. The USB-Type-C interface 60a can change the supply or reception of power depending on the situation. For example, when the printing apparatus 2 is a source, the external device 10a coupled to the USB-Type-C interface 60a is a sink. In addition, when the printing apparatus 2 is a sink, the external device 10a coupled to the USB-Type-C interface 60a is a source.

The D+/D− terminal 62a is a so-called data transmission/reception terminal. The D+/D− terminal 62a is a terminal for transmitting and receiving a data signal to and from the external device 10a. Therefore, data signals can be transmitted and received between the printing apparatus 2 and the external device 10a.

The CC terminal 63a is a so-called state identification terminal. The CC terminal 63a is a terminal that identifies whether the D+/D− terminal 62a is in a state where the data signal can be received from the external device 10a or is in a state where the data signal can be transmitted to the external device 10a. For example, the CC terminal 63a is a terminal that identifies whether the VBUS terminal 61a is in a state where power can be supplied from the external device 10a or is in a state where power can be supplied to the external device 10a. Therefore, the USB controller 34 can identify the state of the external device 10a.

When the external device 10a is not coupled to the USB-Type-C interface 60a, the CC terminal 63a alternately switches between a first potential E1 and a second potential E2 at regular intervals during a unit time. When the external device 10a is coupled to the USB-Type-C interface 60a, the potential of the CC terminal 63a is fixed. For example, the potential of the CC terminal 63a may be fixed to the first potential E1 when the external device 10a functions as a host, and may be fixed to the second potential E2 when the external device 10a functions as a device, and vice versa.

Figure 6:
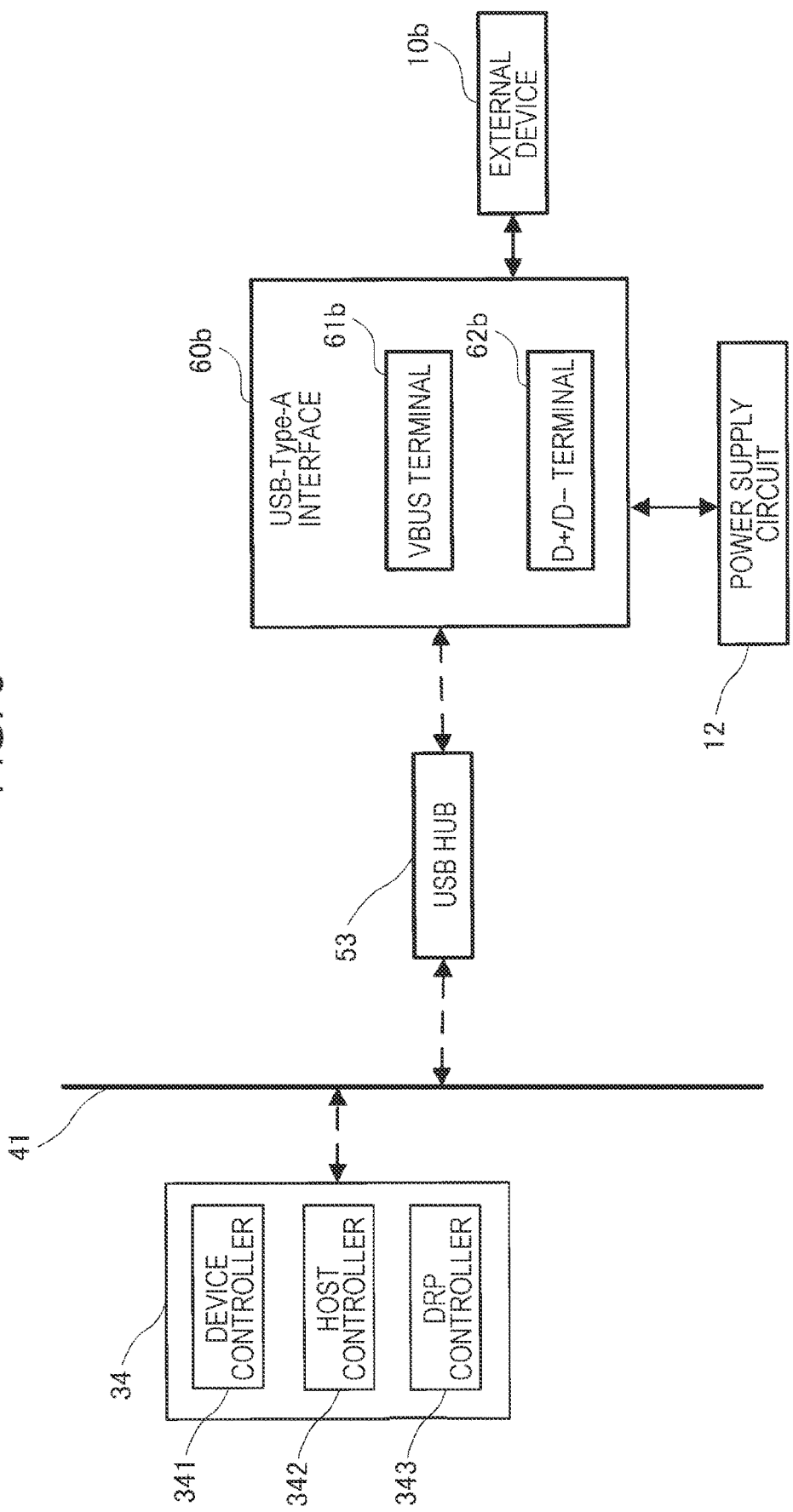
FIG. 6 is a block diagram of the USB controller and a USB-Type-A interface.

Next, the USB-Type-A interface 60b will be described with reference to FIG. 6. FIG. 6 is a block diagram of the USB controller 34 and the USB-Type-A interface 60b.

The USB-Type-A interface 60b includes a VBUS terminal 61b and a D+/D− terminal 62b. Unlike the above-described USB-Type-C interface 60a, the CC terminal 63a is omitted. Therefore, the USB-Type-A interface 60b does not have a function of identifying the state of the coupled external device 10b.

The USB-Type-A interface 60b is supplied with power from the power supply circuit 12, and supplies power to the external device 10b via the VBUS terminal 61b. For example, the voltage supplied to the USB-Type-A interface 60b by the power supply circuit 12 is 5 V. Further, the USB-Type-A interface 60b transmits a signal to the external device 10b via the D+/D– terminal 62b. The external device 10b generally functions as a host.

The USB hub 53 electrically coupled to the USB-Type-A interface 60b is controlled by the host controller 342 of the USB controller 34 via the system bus 41. In other words, the USB-Type-A interface 60b is controlled by the host controller 342.

Figure 7:
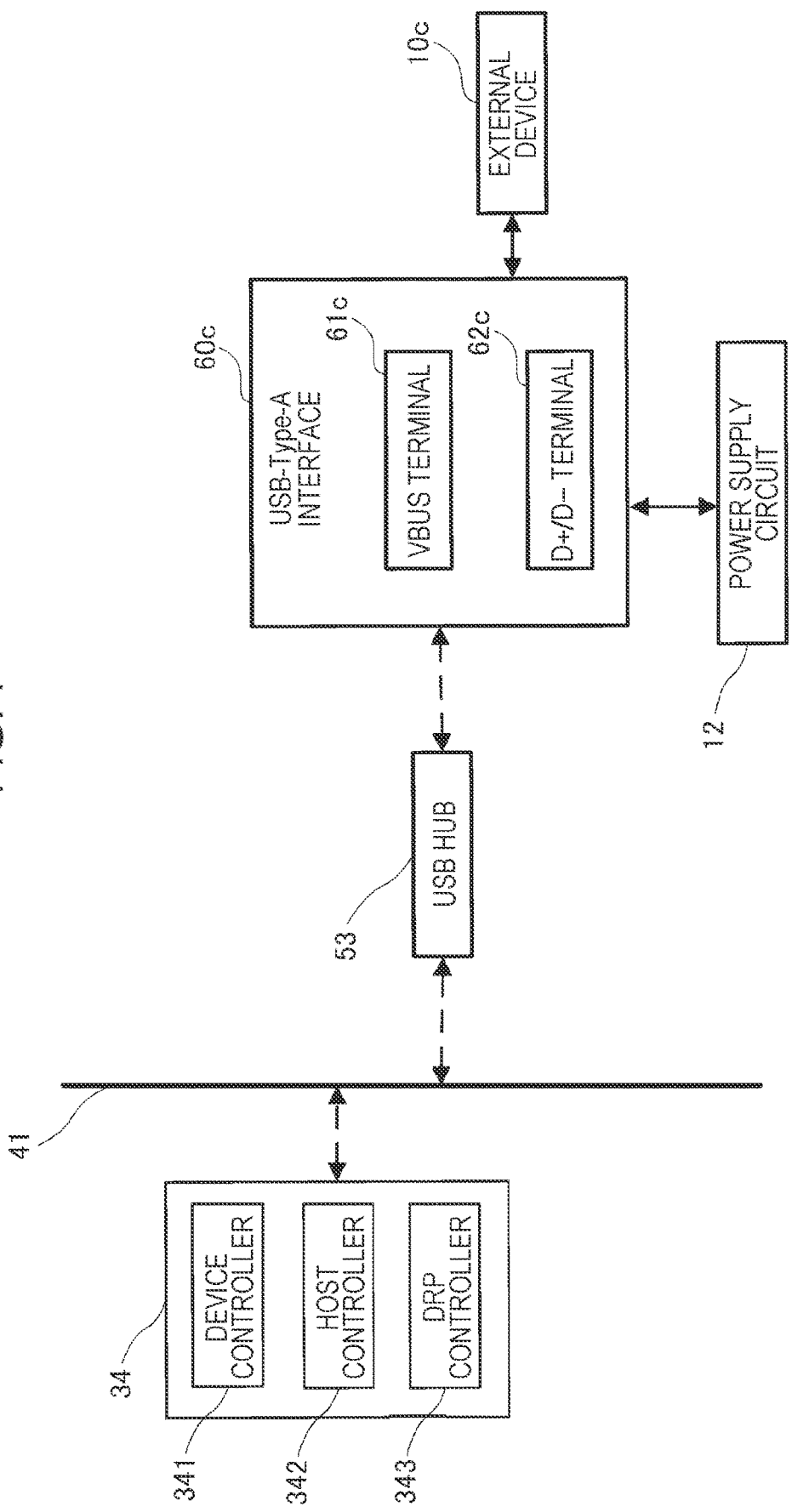
FIG. 7 is a block diagram of the USB controller and the USB-Type-A interface.

Since the USB-Type-A interface 60c illustrated in FIG. 7 has the same configuration as the USB-Type-A interface 60b illustrated in FIG. 6, the description thereof will be omitted.

Figure 8:
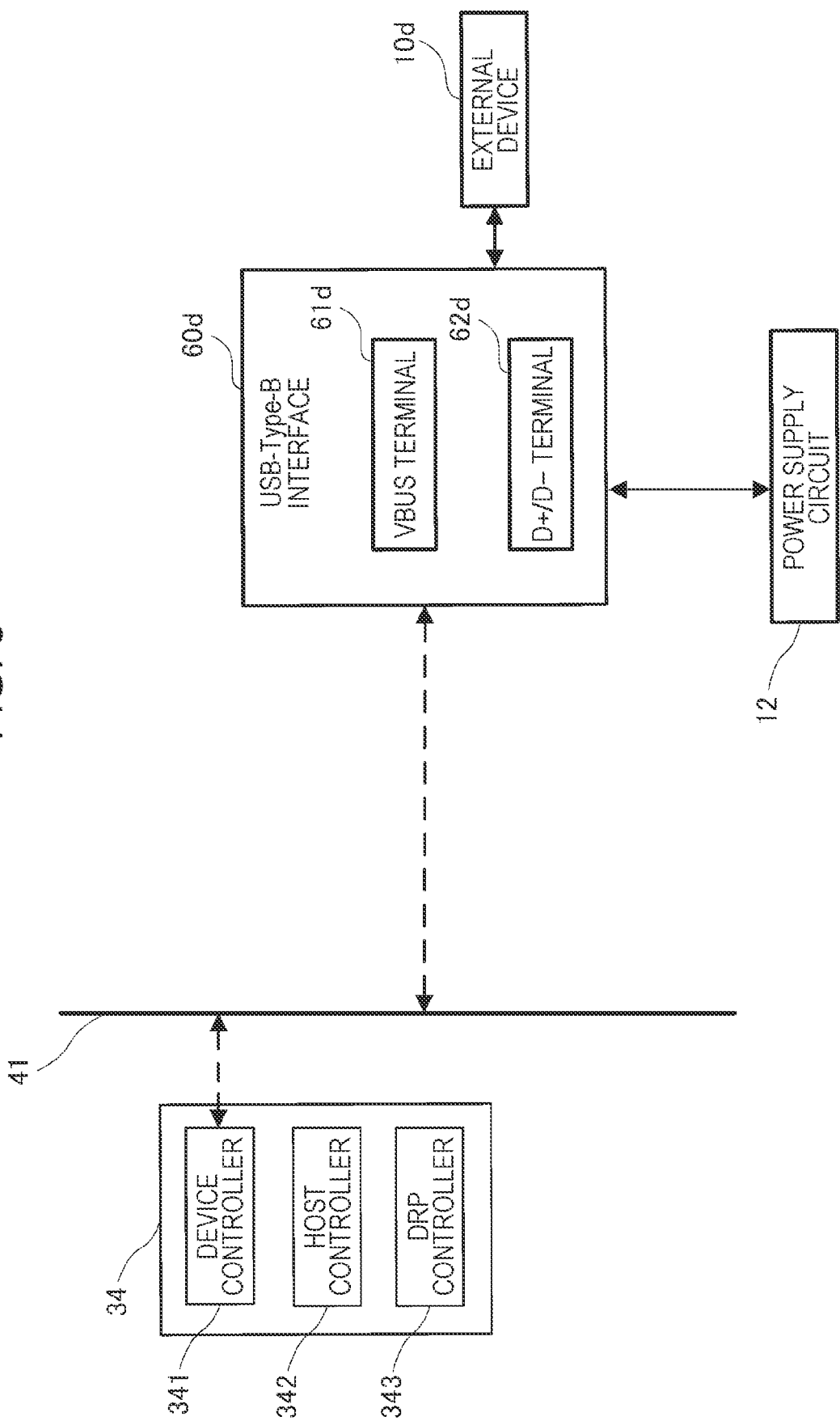
FIG. 8 is a block diagram of the USB controller and a USB-Type-B interface.

Next, the USB-Type-B interface 60d will be described with reference to FIG. 8. FIG. 8 is a block diagram of the USB controller 34 and the USB-Type-B interface 60d.

The USB-Type-B interface 60d includes a VBUS terminal 61d and a D+/D– terminal 62d. Unlike the above-described USB-Type-C interface 60a, the CC terminal 63a is omitted. Therefore, the USB-Type-B interface 60d does not have a function of identifying the state of the coupled external device 10d.

The USB-Type-B interface 60d is supplied with power from the power supply circuit 12, and supplies power to the external device 10d via the VBUS terminal 61d. For example, the voltage supplied to the USB-Type-B interface 60d by the power supply circuit 12 is 5 V. Further, the USB-Type-B interface 60d transmits a signal to the external device 10d via the D+/D– terminal 62d. The external device 10d generally functions as a host.

The USB-Type-B interface 60d is controlled by the device controller 341 of the USB controller 34 via the system bus 41.

In other words, unlike the USB-Type-A interfaces 60b and 60c, the USB-Type-B interface 60d is controlled from the USB controller 34 without going through the USB hub 53. The USB-Type-B interface 60d may be configured to be controlled from the USB controller 34 via the USB hub 53.

2. Printing Apparatus State Priority Setting

The control section 30 is in a state where the printing apparatus 2 operates as a USB device when the external device 10d that functions as a USB host is coupled to the USB-Type-B interface 60d (first external communication interface, first USB port) (first state). In this case, the USB controller 34 capable of communicating with the external device 10d transmits a control signal to the CPU 31, and the CPU 31 controls the printing apparatus 2 to be in the USB device state.

Further, the control section 30 is in a state where the printing apparatus 2 operates as a USB host when the external device 10a that functions as a USB device is coupled to the USB-Type-C interface 60a (second external communication interface, second USB port) (second state). In this case, the USB controller 34 capable of communicating with the external device 10a transmits a control signal to the CPU 31, and the CPU 31 controls the printing apparatus 2 to be in the USB host state.

The control section 30 can set whether the first state has priority over the second state or the second state has priority over the first state when the printing section 20 is not performing printing. The control section 30 performs setting designated by the operation information out of the setting for giving priority to the first state and the setting for giving priority to the second state based on operation information from an external device capable of communicating with the printing apparatus 2 or operation information from an operation section (not illustrated) provided in the printing apparatus 2. In addition, the time when the printing section 20 is not performing printing is a period other than a period from the time when the printing section 20 receives the print data to the time when printing is finished.

When the setting for giving priority to the first state is performed, the control section 30 sets a state where the printing apparatus 2 operates as a USB device when the external device 10a that functions as a USB device is coupled to the USB-Type-C interface 60a in a state where the external device 10d that functions as a USB host is coupled to the USB-Type-B interface 60d, and when the external device 10d that functions as a USB host is coupled to the USB-Type-B interface 60d in a state where the external device 10a that functions as a USB device is coupled to the USB-Type-C interface 60a. In this case, the USB controller 34 does not execute communication with the external device 10a that functions as a USB device, and executes communication with the external device 10d that functions as a USB host. That is, the control section 30 performs a control for giving priority to the USB device state and for giving priority to communication with the external device 10d.

When the setting for giving priority to the second state is performed, the control section 30 sets a state where the printing apparatus 2 operates as a USB host when the external device 10a that functions as a USB device is coupled to the USB-Type-C interface 60a in a state where the external device 10d that functions as a USB host is coupled to the USB-Type-B interface 60d, and when the external device 10d that functions as a USB host is coupled to the USB-Type-B interface 60d in a state where the external device 10a that functions as a USB device is coupled to the USB-Type-C interface 60a. In this case, the USB controller 34 does not execute communication with the external device 10d that functions as a USB host, and executes communication with the external device 10a that functions as a USB device. That is, the control section 30 performs a control for giving priority to the USB host state and for giving priority to communication with the external device 10a.

When the external device 10a that does not correspond to the USB-PD standard is coupled to the USB-Type-C interface 60a, the control section 30 sets a state of supplying a voltage of 5 V (corresponding to the first power amount of energy) to the external device 10a (third state).

Further, when the external device 10a that corresponds to the USB-PD standard is coupled to the USB-Type-C interface 60a, the control section 30 sets a state of supplying a voltage corresponding to the USB-PD standard (corresponding to the second power amount of energy) to the external device 10a (fourth state).

The control section 30 can set whether the third state has priority over the fourth state or the fourth state has priority over the second state when the printing section 20 is not performing printing. The control section 30 performs setting designated by the operation information out of the setting for giving priority to a third state and the setting for giving priority to a fourth state based on operation information from an external device capable of communicating with the printing apparatus 2 or operation information from an operation section (not illustrated) provided in the printing apparatus 2.

When the setting for giving priority to the third state is performed, the control section 30 sets a state of supplying a voltage of 5 V to the external device 10a regardless of whether or not the external device 10a coupled to the USB-Type-C interface 60a corresponds to the USB-PD standard.

When the setting for giving priority to the fourth state is performed, the control section 30 sets a state of supplying a voltage of any of 5 V, 9 V, and 12 V corresponding to the USB-PD standard to the external device 10a when the external device 10a corresponding to the USB-PD standard is coupled to the USB-Type-C interface 60a. In this case, the PD controller performs communication (negotiation) with the external device 10a to determine a voltage to be supplied, and performs a control to supply the determined voltage to the external device 10a.

The control section 30 controls the current state (first to fourth states) of the printing apparatus 2 to be capable of notifying the current state of the printing apparatus 2 by the display section 11 which is the LED panel including a plurality of LEDs. For example, the control section 30 may control the light emission of the LED panel to perform a control of notifying whether the printing apparatus 2 is in the first state or the second state (or whether the setting is a setting for giving priority to the first state or a setting for giving priority to the second state), and to perform a control of notifying whether the printing apparatus 2 is in the third state or the fourth state (or whether the setting is a setting for giving priority to the third state or a setting for giving priority to the fourth state), and in a case of the fourth state, may perform a control of notifying the voltage (any of 5 V, 9 V, and 12 V) to be supplied to the external device 10a. The notification of the state by the LED panel may be performed by a single LED or by a plurality of LEDs. Further, the state may be notified by the emission color of the single or a plurality of LEDs, or the state may be notified by the emission pattern (turning-on, turning-off, blinking pattern, and the like) of the single or a plurality of LEDs. For example, the emission colors or emission patterns of the single or plurality of LEDs may be controlled to be different from each other between the first state and the second state, and the emission colors or the emission patterns of the single or plurality of LEDs may be controlled to be different from each other between the third state and the fourth state.

Further, only when a predetermined command is received, the control section 30 performs a control to notify the current state (first to fourth states) by the LED panel for a certain period of time after receiving the command, and when a predetermined command is not received, the control section 30 performs a control to notify other information (at least one of the power state, the paper state, the error state, and the communication state) by the LED panel. That is, the above state can be notified by using the existing LED panel provided in the printing apparatus 2. The predetermined command may be a command input by the user operating an external device capable of communicating with the printing apparatus 2, or may be a command input by operating an operation section (not illustrated) provided in the printing apparatus 2 by the user.

Figure 9:
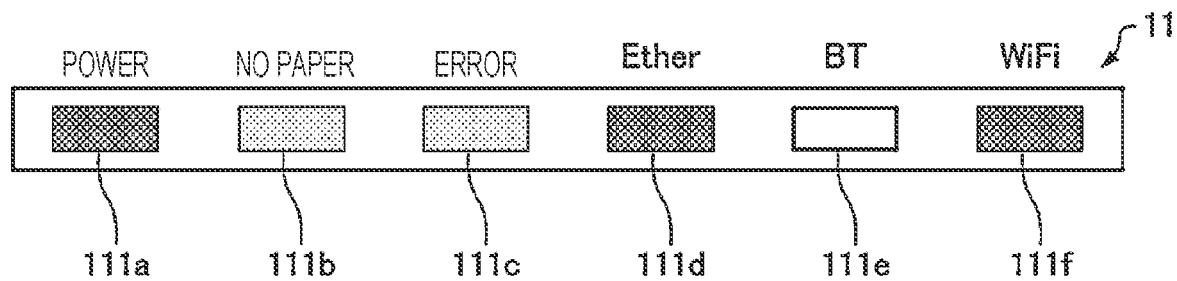
FIG. 9 is a diagram illustrating an example of an LED panel.
Figure 10:
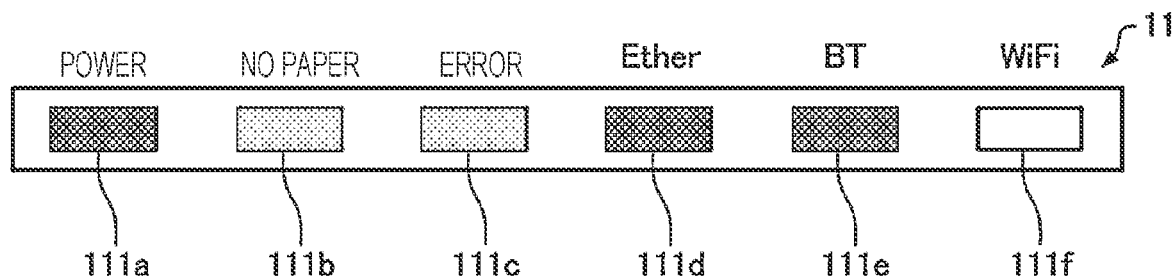
FIG. 10 is a diagram illustrating an example of the LED panel.
Figure 11:
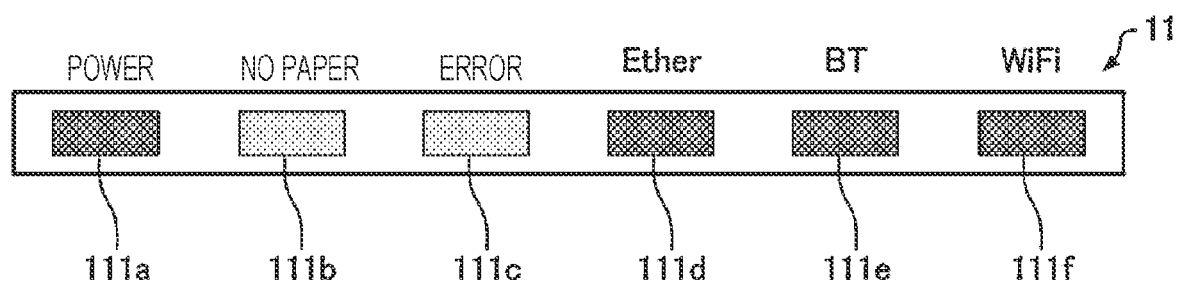
FIG. 11 is a diagram illustrating an example of the LED panel.

FIGS. 9 to 11 are diagrams illustrating an example of the LED panel (display section 11). In this example, the LED panel includes six LEDs 111a to 111f. When a predetermined command is not received, an LED 111a indicates on/off of the power by blinking or emission color, an LED 111b indicates whether or not the paper (roll paper) ran out by blinking or emission color, an LED 111c indicates whether or not there is an error by blinking or emission color, an LED 111d indicates whether or not Ethernet is coupled by the wired communication section by blinking or emission color, an LED 111e indicates whether or not Bluetooth is coupled by the wireless communication section 36 by blinking or emission color, and an LED 111f indicates whether or not Wi-Fi is coupled by the wireless communication section 36 by blinking or an emission color.

In the example illustrated in FIGS. 9 to 11, when a predetermined command is received, the two LEDs 111e and 111f notify the voltage to be supplied to the external device 10a in the fourth state. That is, as illustrated in FIG. 9, by turning off the LED 111e and turning on the LED 111f (indicating a binary number of "01"), it is notified that a voltage of 5 V is being supplied to the external device 10a corresponding to the USB-PD standard coupled to the USB-Type-C interface 60a. As illustrated in FIG. 10, by turning on the LED 111e and turning off the LED 111f (indicating a binary number "10"), it is notified that a voltage of 9 V is being supplied to the external device 10a. As illustrated in FIG. 11, by turning on the LED 111e and the LED 111f (indicating a binary number "11"), it is notified that a voltage of 12 V is being supplied to the external device 10a. When a predetermined command is received, the LEDs 111a to 111d may be used to notify the other states. For example, when the setting for giving priority to the first state is performed, the LED 111a may be controlled to be turned on (or turned on with the first emission color). When the setting for giving priority to the second state is performed, the LED 111a may be controlled to be turned off (or turned on with the second emission color). When the setting for giving priority to the third state is performed, the LED 111b may be controlled to be turned on (or turned on with the first emission color). When the setting for giving priority to the fourth state is performed, the LED 111b may be controlled to be turned off (or turned on with the second emission color). In addition to the existing LED panel, a dedicated LED or an LED panel for notifying the first to fourth states may be provided. In this case, it is not necessary to receive the predetermined command. Further, the existing LED panel and the dedicated LED or the LED panel may be used in combination to notify the first to fourth states.

The embodiments and the modification examples have been described above, but the present disclosure is not limited to the embodiments, and can be implemented in various aspects without departing from the gist thereof. For example, the above-described embodiments can also be appropriately combined with each other.

The present disclosure includes substantially the same configurations (for example, configurations having the same functions, methods, and results, or configurations having the same objects and effects) as the configurations described in the embodiments. Further, the present disclosure includes configurations in which non-essential parts of the configuration described in the embodiments are replaced. In addition, the present disclosure includes configurations that achieve the same operational effects or configurations that can achieve the same objects as those of the configurations described in the embodiment. Further, the present disclosure includes configurations in which a known technology is added to the configurations described in the embodiments.

The following contents are derived from the above-described embodiments and modification examples.

According to an aspect, there is provided a printing apparatus including: a printing section; a first external communication interface; a second external communication interface; and a control section, in which the first external communication interface is a first USB port, the second external communication interface is a second USB port, and the control section is configured to set a state where the printing apparatus operates as a USB device when an external device coupled to a USB port is a USB host, set a state where the printing apparatus operates as a USB host when the external device coupled to the USB port is a USB device, set a state of supplying a first power amount of energy to the external device coupled to the USB port, set a state of supplying a second power amount of energy, which is greater than the first power amount, to the external device coupled to the USB port, and perform setting for giving priority to at least one of the states over another state when the printing section is not performing printing.

According to this printing apparatus, for example, it is possible to set whether the printing apparatus gives priority to the USB device state or gives priority to the USB host state, to set whether to give priority to the state of supplying the first power amount of energy or the state of supplying the second power amount of energy to the external device, and to set the printing apparatus in a state that the user prefers even when a new external device is coupled.

In the printing apparatus according to the aspect, an LED panel including a plurality of LEDs may further be provided, and the LED panel may be configured to notify the current state of the printing apparatus by the LED.

According to this printing apparatus, the user can grasp the current state of the printing apparatus.

In the printing apparatus according to the aspect, the LED panel may notify the state only when a predetermined command is received, and notify other information in other cases.

According to this printing apparatus, it is possible for the user to grasp the current state of the printing apparatus by using the existing LED provided in the printing apparatus.

In the printing apparatus according to the aspect, the LED may be an LED indicating at least one of a power state, a paper state, an error state, and a communication state when the predetermined command is not received.

In the printing apparatus according to the aspect, the LED panel may have different emission colors or emission patterns between the state of supplying the first power amount of energy to the external device coupled to the USB port and the state of supplying the second power amount of energy to the external device coupled to the USB port.

In the printing apparatus according to the aspect, the LED panel may have different emission colors or emission patterns between the state where the printing apparatus operates as a USB device when the external device coupled to the USB port is a USB host and the state where the printing apparatus operates as a USB host when the external device coupled to the USB port is a USB device.

In the printing apparatus according to the aspect, the LED may have different emission colors or emission patterns between the state of supplying the first power amount of energy to the external device coupled to the USB port and the state of supplying the second power amount of energy to the external device coupled to the USB port.

In the printing apparatus according to the aspect, the LED may have different emission colors or emission patterns between the state where the printing apparatus operates as a USB device when the external device coupled to the USB port is a USB host and the state where the printing apparatus operates as a USB host when the external device coupled to the USB port is a USB device.

What is claimed is:

1. A printing apparatus comprising:
    a printing section;
    a first external communication interface;
    a second external communication interface; and
    a control section, wherein
    the first external communication interface is a first USB port,
    the second external communication interface is a second USB port, and
    the control section is configured to
        set a first state where the printing apparatus operates as a USB device when an external device coupled to the first USB port is a USB host,
        set a second state where the printing apparatus operates as a USB host when an external device coupled to the second USB port is a USB device,
        set a third state of supplying a first power amount of energy to an external device coupled to one of the first and second USB ports,
        set a fourth state of supplying a second power amount of energy, which is greater than the first power amount, to the external device coupled to the one of the first and second USB ports,
        perform a first setting for giving priority to one of the first and second states over the other one of the first and second states when the printing section is not performing printing, and
        perform a second setting for giving priority to one of the third and fourth states over the other one of the third and fourth states when the printing section is not performing printing.

2. The printing apparatus according to claim 1, further comprising:
    an LED panel including a plurality of LEDs, wherein
    the LED panel is configured to notify a current state of the printing apparatus by the LED.

3. The printing apparatus according to claim 2, wherein the LED panel notifies the current state only when a predetermined command is received, and notifies other information in other cases.

4. The printing apparatus according to claim 3, wherein the LED is an LED indicating at least one of a power state, a paper state, an error state, and a communication state when the predetermined command is not received.

5. The printing apparatus according to claim 2, wherein the LED panel has different emission colors or emission patterns between the third state of supplying the first power amount of energy to the external device coupled to the one of the first and second USB ports and the fourth state of supplying the second power amount of energy to the external device coupled to the one of the first and second USB ports.

6. The printing apparatus according to claim 2, wherein the LED panel has different emission colors or emission patterns between the first state where the printing apparatus operates as a USB device when the external device coupled to the first USB port is a USB host and the second state where the printing apparatus operates as a USB host when the external device coupled to the second USB port is a USB device.

7. The printing apparatus according to claim 2, wherein the LED has different emission colors or emission patterns between the third state of supplying the first power amount of energy to the external device coupled to the one of the first and second USB ports and the fourth state of supplying the second power amount of energy to the external device coupled to the one of the first and second USB ports.

8. The printing apparatus according to claim 2, wherein the LED has different emission colors or emission patterns between the first state where the printing apparatus operates as a USB device when the external device coupled to the first USB port is a USB host and the second state where the printing apparatus operates as a USB host when the external device coupled to the second USB port is a USB device.

* * * * *